United States Patent
Lindmark

(12) 
(10) Patent No.: US 12,495,087 B2
(45) Date of Patent: Dec. 9, 2025

(54) PROVIDING VIDEO STREAMS FOR PRESENTATION IN A USER INTERFACE OF A VIDEO CONFERENCE BASED ON A USER PRIORITY LIST

(71) Applicant: Google LLC, Mountain View, CA (US)

(72) Inventor: Stefan Lindmark, Östhammar (SE)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 18/345,300

(22) Filed: Jun. 30, 2023

(65) Prior Publication Data

US 2025/0007975 A1    Jan. 2, 2025

(51) Int. Cl.
| | |
|---|---|
| H04L 65/1089 | (2022.01) |
| G06F 3/0482 | (2013.01) |
| H04L 65/1093 | (2022.01) |
| H04L 65/403 | (2022.01) |
| H04L 65/80 | (2022.01) |

(52) U.S. Cl.
CPC ............ *H04L 65/80* (2013.01); *G06F 3/0482* (2013.01); *H04L 65/1089* (2013.01); *H04L 65/1093* (2013.01); *H04L 65/403* (2013.01)

(58) Field of Classification Search
CPC ............. H04L 65/1066; H04L 65/1093; H04L 65/1089; H04L 65/403
See application file for complete search history.

(56) References Cited

U.S. PATENT DOCUMENTS

| | | | |
|---|---|---|---|
| 8,832,193 B1* | 9/2014 | Lindberg | H04L 67/10 709/204 |
| 9,626,651 B2* | 4/2017 | Lakshmanan | G10L 15/26 |
| 9,959,523 B2* | 5/2018 | Lewis | H04N 7/147 |
| 11,082,661 B1* | 8/2021 | Pollefeys | H04N 7/15 |
| 11,245,736 B2* | 2/2022 | Caston | G06Q 10/101 |
| 11,290,465 B1* | 3/2022 | Lyons | H04N 7/15 |
| 11,507,342 B1* | 11/2022 | Agrawal | G06V 40/20 |

(Continued)

FOREIGN PATENT DOCUMENTS

WO    2022245787 A1    11/2022

OTHER PUBLICATIONS

International Search Report and Written Opinion for International Application No. PCT/US2024/035300, mailed Sep. 26, 2024, 19 Pages.

*Primary Examiner* — Alina A Boutah
*Assistant Examiner* — Adam A Cooney
(74) *Attorney, Agent, or Firm* — Lowenstein Sandler LLP

(57) ABSTRACT

Systems and methods for determining video streams for presentation in a user interface (UI) of a video conference are provided. In response to a request of a first user of a video conference platform to participate in video conference, a user priority list associated with the first user is accessed. The user priority list identifies a plurality of users of the video conference platform. Participants of the video conference are identified. The participants include the first user associated with a first client device of client devices of the participants of the video conference. A UI presenting video streams from client devices of at least a subset of the participants is provided for display on the first client device. presentation of each of the video streams in the UI depends on whether a respective participant of the at least the subset of the participants is included in the user priority list.

18 Claims, 6 Drawing Sheets

(56) References Cited

U.S. PATENT DOCUMENTS

| | | | |
|---|---|---|---|
| 2008/0068446 A1* | 3/2008 | Barkley | H04N 19/187 348/14.07 |
| 2011/0231396 A1* | 9/2011 | Dhara | H04L 47/70 707/751 |
| 2012/0092438 A1* | 4/2012 | Guzman Suarez | H04N 7/15 348/E7.083 |
| 2013/0063542 A1* | 3/2013 | Bhat | H04L 12/1822 348/E7.083 |
| 2014/0173515 A1 | 6/2014 | Efrati et al. | |
| 2017/0085691 A1* | 3/2017 | Kim | H04M 1/2757 |
| 2018/0113913 A1* | 4/2018 | Lee | H04L 51/216 |
| 2018/0176508 A1* | 6/2018 | Pell | H04L 65/403 |
| 2018/0367757 A1* | 12/2018 | Faulkner | H04N 21/47 |
| 2020/0396266 A1* | 12/2020 | Goel | H04L 67/306 |
| 2021/0051357 A1* | 2/2021 | Luo | H04N 21/251 |
| 2022/0103784 A1 | 3/2022 | Pollefeys | |
| 2022/0311634 A1* | 9/2022 | Sengupta | H04L 65/1093 |
| 2022/0374136 A1* | 11/2022 | Chang | G06F 3/04845 |
| 2023/0077712 A1* | 3/2023 | Purnell | H04L 67/75 348/14.01 |
| 2023/0396569 A1* | 12/2023 | Boyd | G06F 3/0482 |

\* cited by examiner

300

```
┌─────────────────────────────────────────────────────────────────────┐
│ In response to a request of a first user of a video conference platform to participate in a │
│ video conference, access a user priority list associated with the first user, wherein the │
│    user priority list identifies multiple other users of the video conference platform     │
│                                         302                                         │
└─────────────────────────────────────────────────────────────────────┘
                                          │
                                          ▼
┌─────────────────────────────────────────────────────────────────────┐
│  Identify a plurality of participants of the video conference, the plurality of participants │
│     including the first user associated with a first client device of a plurality of client  │
│              devices of the plurality of participants of the video conference               │
│                                         304                                         │
└─────────────────────────────────────────────────────────────────────┘
                                          │
                                          ▼
┌─────────────────────────────────────────────────────────────────────┐
│    Provide, for display on the first client device, a graphical user interface (GUI)        │
│   presenting video streams from client devices of at least a subset of the plurality of     │
│  participants, wherein presentation of each of the video streams in the GUI depends on      │
│  whether a respective participant of the at least the subset of the plurality of participants │
│                       is included in the user priority list.                        │
│                                         306                                         │
└─────────────────────────────────────────────────────────────────────┘
```

FIG. 3

PROVIDING VIDEO STREAMS FOR PRESENTATION IN A USER INTERFACE OF A VIDEO CONFERENCE BASED ON A USER PRIORITY LIST

TECHNICAL FIELD

Aspects and implementations of the present disclosure relate to providing video streams for presentation in a user interface (UI) of a video conference based on a user priority list.

BACKGROUND

Video conferences may take place between multiple participants via a video conference platform. A video conference platform includes tools that allow multiple client devices to be connected over a network and share each other's audio (e.g., voice of a user recorded via a microphone of a client device) and/or video stream (e.g., a video captured by a camera of a client device, or video captured from a screen image of the client device) for efficient communication. To this end, the video conference platform may provide a user interface to display the video streams of participating client devices.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a computer-implemented method that includes providing video streams for presentation in a user interface (UI) of a video conference based on a user priority list. In an implementation, the method includes in response to a request of a first user of a video conference platform to participate in a video conference, accessing a user priority list associated with the first user. The user priority list identifies multiple users of the video conference platform. The method further includes identifying multiple participants of the video conference. The multiple participants include the first user associated with a first client device of multiple client devices of the multiple participants of the video conference. The method further includes providing, for display on the first client device, a UI presenting video streams from client devices of at least a subset of the multiple participants, wherein presentation of each of the video streams in the UI depends on whether a respective participant of the at least the subset of the multiple participants is included in the user priority list.

In some embodiments, providing the UI presenting the video streams from the client devices of the at least the subset of the multiple participants includes identifying, among the multiple participants, one or more participants from the user priority list, and including the one or more participants from the user priority list in the at least the subset of the multiple participants. In some embodiments, including the one or more participants from the user priority list in the at least the subset of the multiple participants further includes refraining from including, in the at least the subset of the multiple participants, one or more other participants that are not part of the user priority list.

In some embodiments, providing the UI presenting the video streams from the client devices of the at least the subset of the multiple participants further includes identifying, among the multiple participants, one or more other participants that are not part of the user priority list, and including the one or more other participants that are not part of the user priority list in the at least the subset of the multiple participants. In some embodiments, the method further includes rearranging video streams in the UI based on whether a respective video stream corresponds to a participant included in the user priority list.

In some embodiments, rearranging the video streams in the UI based on whether a respective video stream corresponds to a participant included in the user priority list includes at least one of increasing a size of a visual representation of one or more video streams corresponding to participants included in the user priority list, or decreasing a size of a visual representation of one or more video streams corresponding to participants not included in the user priority list. In some embodiments, rearranging video streams in the UI based on whether a respective video stream corresponds to a participant included in the user priority list includes modifying a location of one or more video streams corresponding to participants included in the user priority list to a respective main region of one or more main regions of the UI, and modifying a location of video streams corresponding to other participants not included in the user priority list to a respective other region of one or more other regions of the UI.

In some embodiments, the method further includes identifying an additional user of the video conference platform to be added to the user priority list. The method further includes updating the user priority list to include the additional user to obtain and updated user priority list. The method further includes storing the updated user priority list in a data store in association with an identifier of the first user for use in subsequent video conferences in which the first user is to participate, wherein the data store stores multiple user priority lists each associated with an identifier of one of multiple users of the video conference platform.

In some embodiments, identifying the additional user includes receiving a request from the first client device to add the additional user of the video conference platform to the user priority list, where the request is received in response to an interaction by the first user with one or more UI elements of the UI. In some embodiments, identifying the additional user includes using a machine learning model to predict the additional user that the first user is likely to be interested in including in the user priority list and causing an identifier of the additional user to be presented to the first user as a suggested addition to the user priority list. The method further includes receiving a confirmation of the first user to add the additional user to the user priority list.

In some embodiments, the method further includes, responsive to updating the user priority list to include the additional user, identifying a participant of the multiple participants of the video conference corresponding to the additional user, and including the participant in the at least the subset of the multiple of participants. In some embodiments, the method further includes restricting access to the user priority list to the first user. In some embodiments, when an additional user is added to the user priority list, a notification to the additional user is suppressed.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 3 depicts a flow diagram of a method for providing video streams for presentation in a user interface (UI) of a video conference based on a user priority list, in accordance with implementations of the present disclosure.

DETAILED DESCRIPTION

Figure 1:
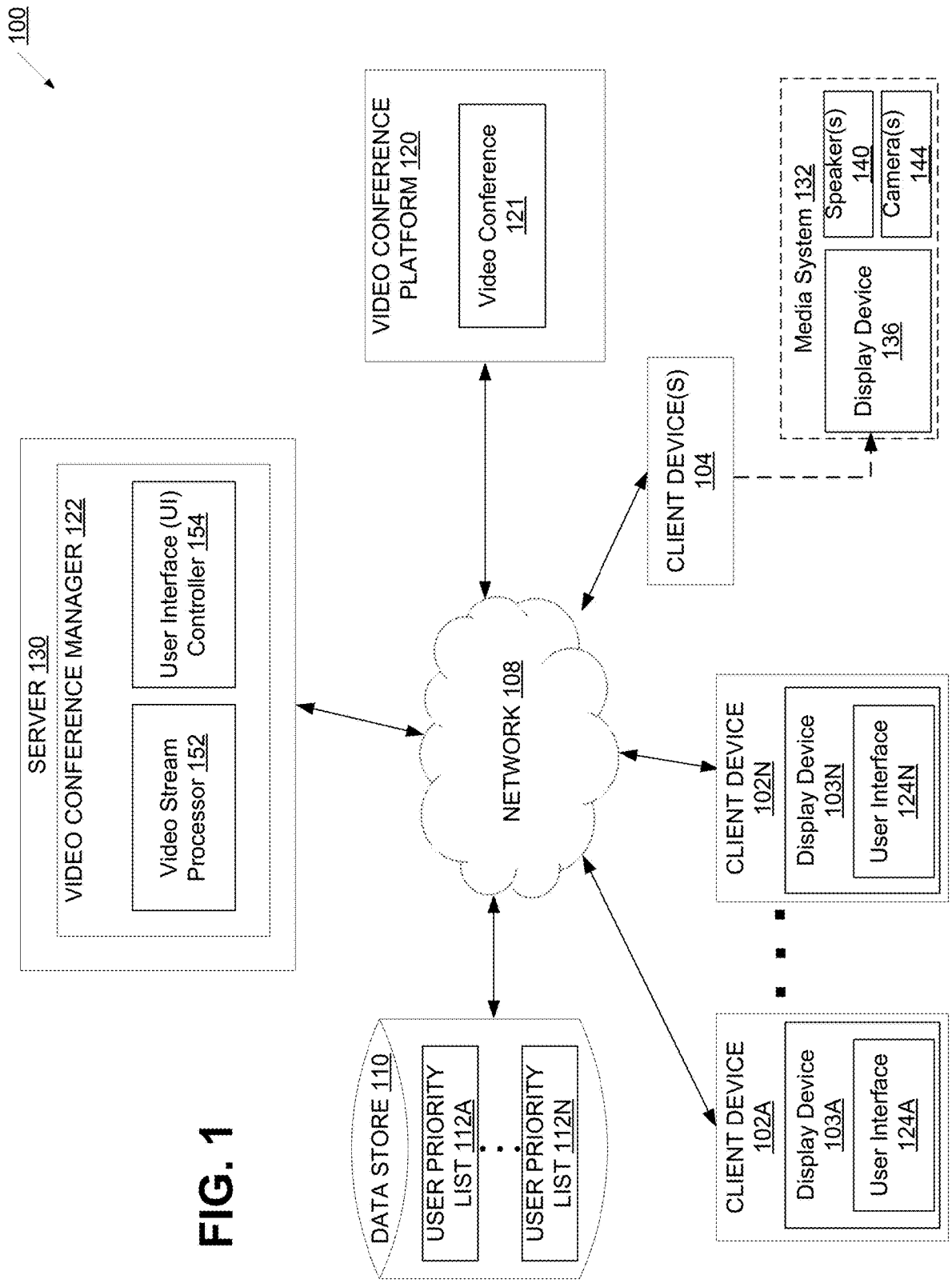
FIG. 1 illustrates an example system architecture, in accordance with implementations of the present disclosure.

Aspects of the present disclosure relate to presenting video streams in a user interface (UI) of a video conference based on a user priority list (also referred to as a very important person (VIP) list here). A video conference can refer to a virtual meeting during which a client device connected to the video conference platform captures and transmits image data (e.g., collected by a camera of the client device) and/or audio data (e.g., collected by a microphone of the client device) to other client devices connected to the platform. The image data can, in some instances, depict a user or a group of users that are participating in the virtual meeting. The audio data can include, in some instances, an audio recording of audio provided by the user or group of users during the virtual meeting. A video conference platform may enable video-based conferences between multiple participants via respective client devices that are connected over a network and share each other's audio (e.g., voice of a user recorded via a microphone of a client device) and/or video streams (e.g., a video captured by a camera of a client device) during a video conference. In some instances, a video conference platform may enable a significant number of client devices (e.g., up to one hundred or more client devices) to be connected via the video conference.

A participant of a video conference may speak (e.g., present on a topic) to the other participants of the video conference. Some existing video conference platforms may provide a user interface (UI) to each client device connected to the video conference, where the UI displays the video streams shared over the network in a set of regions in the UI. For example, the video stream of a participant who is speaking to the other participants in the video conference may be displayed in a designated region in the UI of the video conference platform. In some instances, participants in the video conference may choose a particular layout for the display of each video stream of participants in the video conference. For example, some video conference platforms may include a layout of multiple regions presented in the UI, where each region displays a video stream of a participant who has recently spoken or is actively speaking. However, viewing video streams of participants who have recently spoken may fail to accurately represent how interactions occur in a physical meeting. For example, in a physical meeting, a participant may often observe nonverbal reactions (e.g., nodding indicating approval, frowning indicating disapproval, a quizzical look indicating confusion, etc.) of an important participant (e.g., a supervisor, an executive, etc.) of the meeting. Similarly, there are many occasions during a video conference when participants of the video conference may want to actively view one or more video streams of participants other than those who have recently spoken or are not actively speaking. For example, as they would in a physical meeting, participants may want to observe nonverbal reactions of other key participants (e.g., an executives, managers, other decision makers, etc.) that are not actively speaking or have not recently spoken. In many instances, these key participants may remain silent after introductions and let other participants talk and present throughout the remainder of the video conference. Accordingly, existing video conference platforms may fail to display video streams of key participants in the UI when the key participants are not actively speaking. This may cause frustrations for participants that would want to closely observe nonverbal reactions of such key participants.

A conventional solution to handle these situations is to allow a participant in the video conference to "pin" (e.g., by interacting with a UI element) video streams of the key participants such that they remain visible within the UI. However, "pinning" a video stream is conventionally a temporary action within a current video conference and may fail to persist for future video conferences. Accordingly, users of a video conference platform usually have to "pin" a video stream of the same key participant over multiple video conferences. This may burden participants of the video conference with additional tasks, require additional computing resources to support these tasks, and disrupt the video conference flow for participants of the video conference. In some instances, the video conference platform may enable a significant number of participants (e.g., five hundred or more participants) to interact via the video conference. As a result, a participant may search through a lengthy list of all participants of the video conference to locate and "pin" a key participant, which would further result in additional tasks and unnecessary consumption of computing resources, thereby decreasing overall efficiency and increasing overall latency of the video conference platform.

Implementations of the present disclosure address the above and other deficiencies by determining which video streams to be provided for presentation in a user interface (UI) of a video conference based on a user priority list. The user priority list may be stored in association with an identifier of a user for use across multiple video conferences in which the user participates. When the user requests to participate in a video conference, the user priority list is accessed and used during the video conference to ensure that participants that are important to the user are visible to the user throughout the video conference without the need of any extra input from the user. Accordingly, the user priority list may be persistent between video conferences to allow such functionality without the need for manual input from the user for each video conference the user attends.

A UI may be provided for presentation on each client device of participants of a video conference, where the UI may display video streams from client devices of participants of a video conference. The user priority list (also referred to as a "very important person (VIP) list" herein) associated with a first user of a video conference platform may be accessed (e.g., from a data store, a client device, etc.). The user priority list may identify users of the video conference platform other than the first user that are important to remain visible to the first user throughout video conferences. For example, the user priority list may include user identifiers associated with users of the platform. The user priority list may include, for example, identifiers of supervisors, managers, presenters, or other very important persons (VIPs) associated with the first user.

A UI may be provided for display on a first client device associated with the first user. The UI may present video streams from client devices of the video conference participants. Presentation of each of the video streams in the UI may depend on whether a participant is included in the user priority list associated with the first user. For example, video streams of one or more participants from the user priority list may be identified and provide for presentation to the first in the UI. In some embodiments, the video conference platform may refrain from presenting video stream of participants not included in the user priority list. Accordingly, the video conference platform may prioritize presenting video streams of participants included in the user priority list over presenting video streams of participant not included in the user priority list.

In some embodiments, a size of a visual representation of video streams associated with participants not included in the user priority list may be decreased to occupy a lesser portion of a UI area. In some embodiments, the size of a visual representation of video streams associated with a participant included in the user priority list may be increased to occupy at least the portion of the UI area previously dedicated to presenting one or more video streams associated with participants not included in the user priority list. In some embodiments, video streams may be rearranged in the UI based on whether a respective video stream corresponds to a participant included in the user priority list. For example, one or more video streams associated with participants that are part of the user priority list may be rearranged to occupy a "main" region of the UI. "Main" regions may include areas in the UI that are at or near a center, an upper, or a focus area of the UI. For example, video streams of participants included in the user priority list may be presented above (e.g., at a top region or an upper region of the UI) video streams of participants not included in the user priority list. Thus, the participants of the video conference may efficiently conduct the video conference with a reduced number of distractions due to an automatic presentation of video streams in the UI that provides good visibility of and appropriate focus on video streams of participants according to user preferences.

It is appreciated that the user priority list can be used to automatically cause a various video streams of interest to a user to be displayed within the UI of the video conference. For example, the user priority list can be leveraged to automatically display, within the UI, a video stream of a key decision make or influencer from the user's organization or an external domain; a co-presenter, waiting for their turn to present; an expert, checking for signs of approval/disapproval; a person likely to talk without a hand raised, checking for signs of preparing to engage; a person that cannot talk in the video conference for any reason; a sign language interpreter; a video feed without audio demonstrating a product or activity that is being discussed by others in the video conference; and the like.

Aspects of the present disclosure provide technical advantages over previous solutions. Aspects of the present disclosure may provide an additional functionality to a video conference tool of the video conference platform that intelligently brings appropriate content (e.g., video streams) to the attention of a participant of a video conference based on a user priority list that may persist between video conferences. Such additional functionality may also result in more efficient use of processing resources utilized to facilitate the connection between client devices by avoiding consumption of computing resources needed to support participants manually managing (e.g., manually "pinning") the display of visual streams of the participants in the UI, thereby resulting in an increase of overall efficiency and a decrease in overall latency of the video conference platform. In addition, according to some aspects of the present disclosure that allow video streams of participants included in a user priority list to occupy more space on the screen, experience of users that participate in video conferences via small-screen devices may be significantly improved.

FIG. 1 illustrates an example system architecture 100, in accordance with implementations of the present disclosure. The system architecture 100 (also referred to as "system" herein) includes client devices 102A-N, one or more client devices 104, a data store 110, a video conference platform 120, and a server 130, each connected to a network 108.

In implementations, network 108 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. A data item may include audio data and/or video stream data, in accordance with embodiments described herein. Data store 110 may be hosted by one or more storage devices, such as main memory, magnetic or optical storage-based disks, tapes or hard drives, NAS, SAN, and so forth. In some implementations, data store 110 may be a network-attached file server, while in other embodiments, data store 110 may be some other type of persistent storage such as an object-oriented database, a relational database, and so forth, that may be hosted by video conference platform 120 or one or more different machines (e.g., the server 130) coupled to the video conference platform 120 via network 108. In some implementations, the data store 110 may store portions of audio and video streams received from the client devices 102A-102N for the video conference platform 120. Moreover, the data store 110 may store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents may be shared with users of the client devices 102A-102N and/or concurrently editable by the users.

In some implementations, the data store 110 may store very important person (VIP) lists 112A-112N (also referred to as "user priority lists 112A-112N" herein) for the video conference platform 120. Each of the user priority lists 112A-112N may be associated with a respective user of the video conference platform 120 and may include multiple other users of the video conference platform 120. The user priority lists 112A-112N may include for example, supervisors, managers, presenters, and/or other important persons associated with the respective user. In some embodiments, users of the video conference platform 120 may edit (e.g., add a user to, remove a user from) a respective user priority list 112A-112N using, for example, a client device 102A-102N. In some embodiments, the user priority list may be stored on and processed one or more associated client device 102A-102N. The user priority list 112A-112N is used herein by way of example, and not by way of limitation. It is appreciated that the functionality of the user priority list as described herein can be implemented with other data structures and is not limited to a list. For example, the user priority list 112A-112N can be implemented as an array, a vector, a set, a linked list, a stack, a queue, a buffer, a tree, a graph, and the like.

Video conference platform 120 may enable users of client devices 102A-102N and/or client device(s) 104 to connect with each other via a video conference (e.g., a video conference 121). A video conference refers to a real-time communication session such as a video conference call, also known as a video-based call or video chat, in which participants may connect with multiple additional participants in real-time and be provided with audio and video capabilities. Real-time communication refers to the ability for users to communicate (e.g., exchange information) instantly without transmission delays and/or with negligible (e.g., milliseconds or microseconds) latency. Video conference platform 120 may allow a user to join and participate in a video conference call with other users of the platform. Embodiments of the present disclosure may be implemented with any number of participants connecting via the video conference (e.g., five hundred or more).

The client devices 102A-102N may each include computing devices such as personal computers (PCs), laptops, mobile phones, smart phones, tablet computers, netbook computers, network-connected televisions, etc. In some implementations, client devices 102A-102N may also be referred to as "user devices 102A-102N." Each client device 102A-102N may include an audiovisual component that may generate audio and video data to be streamed to video conference platform 120. In some implementations, the audiovisual component may include a device (e.g., a microphone) to capture an audio signal representing speech of a user and generate audio data (e.g., an audio file or audio stream) based on the captured audio signal. The audiovisual component may include another device (e.g., a speaker) to output audio data to a user associated with a particular client device 102A-102N. In some implementations, the audiovisual component may also include an image capture device (e.g., a camera) to capture images and generate video data (e.g., a video stream) of the captured data of the captured images.

In some embodiments, video conference platform 120 is coupled, via network 108, with one or more client devices 104 that are each associated with a physical conference or meeting room. Client device(s) 104 may include or be coupled to a media system 132 that may include one or more display devices 136, one or more speakers 140 and one or more cameras 144. Display device 136 may be, for example, a smart display or a non-smart display (e.g., a display that is not itself configured to connect to network 108). Users that are physically present in the room may use media system 132 rather than their own devices (e.g., client devices 102A-102N) to participate in a video conference, which may include other remote users. For example, the users in the room that participate in the video conference may control the display device 136 to show a slide presentation or watch slide presentations of other participants. Sound and/or camera control may similarly be performed. Similar to client devices 102A-102N, client device(s) 104 may generate audio and video data to be streamed to video conference platform 120 (e.g., using one or more microphones, speakers 140 and cameras 144).

Each client device 102A-102N or client device(s) 104 may include a web browser and/or a client application (e.g., a mobile application, a desktop application, etc.). In some implementations, the web browser and/or the client application may present, on a display device 103A-103N of client device 102A-102N, a user interface (UI) (e.g., a UI of the UIs 124A-124N) for users to access video conference platform 120. For example, a user of client device 102A may join and participate in a video conference via a UI 124A presented on the display device 103A by the web browser or client application. A user may also present a document to participants of the video conference via each of the UIs 124A-124N. Each of the UIs 124A-124N may include multiple regions to present video streams corresponding to video streams of the client devices 102A-102N provided to the server 130 for the video conference.

In some implementations, server 130 can include a video conference manager 122. Video conference manager 122 is configured to manage a video conference between multiple users of video conference platform 120. In some implementations, video conference manager 122 may provide the UIs 124A-124N to each client device to enable users to watch and listen to each other during a video conference. Video conference manager 122 may also collect and provide data associated with the video conference to each participant of the video conference. In some implementations, video conference manager 122 may provide the UIs 124A-124N for presentation by a client application (e.g., a mobile application, a desktop application, etc.). For example, the UIs 124A-124N may be displayed on a display device 103A-103N by a native application executing on the operating system of the client device 120A-120N or the client device(s) 104. The native application may be separate from a web browser. In some embodiments, the video conference manager 122 may determine visual items for presentation in the UI 124A-124N during a video conference. A visual item may refer to a UI element that occupies a particular region in the UI and is dedicated to presenting a video stream from a respective client device. Such a video stream may depict, for example, a user of the respective client device while the user is participating in the video conference (e.g., speaking, presenting, listening to other participants, watching other participants, etc., at particular moments during the video conference), a physical conference or meeting room (e.g., with one or more participants present), a document or media content (e.g., video content, one or more images, etc.) being presented during the video conference, and the like. It is appreciated that providing video streams for presentation is described herein by way of example, and not limitations, noting that aspects and embodiments of the present disclosure may be applied to other visual items (e.g., recorded videos) without deviating from the scope of the present disclosure.

In some implementations, the video conference manager 122 includes a video stream processor 152 and a user interface (UI) controller 154. The components may be combined together or separated into further components, according to a particular implementation. It should be noted that in some implementations, various components of the video conference manager 122 may run on separate machines.

The video stream processor 152 may receive video streams from client devices 102A-102N and/or client device(s) 104. The video stream processor 152 may determine video streams for presentation in the UIs 124A-124N during the video conference 121. Each video stream may correspond to a video stream from a client device (e.g., the video stream pertaining to one or more participants of the video conference). In some implementations, the video stream processor 152 may receive audio streams associated with the video streams from the client devices (e.g., from an audiovisual component of the client devices 102A-102N).

In some embodiments, the video stream processor 152 may determine video streams to be provided for presentation in the UIs 124A-124N during the video conference 121 based on user priority lists 112A-112N. Presentation of each of the video streams in the UIs 124A-124N may depend on whether a participant of a subset of participants of the video conference 121 is included in a respective user priority list 112A-112N associated with a respective user. For example, one or more participants of the video conference 121 included in a user priority list 112A associated with a first user of a client device 102A may be identified and included in the subset of participants for presentation of their respective video streams in the UI 124A of client device 102A of the first user. In some embodiments, video stream processor 152 may determine not to include, in the subset of participants whose video streams are to be provided for presentation in the UI 124A, one or more other participants of the video conference 121 that are not part of the user priority list 112A. In some embodiments, the video stream processor 152 may determine to include, in the subset of participants whose streams are to be provided for presentation in the UI 124A, one or more other participants of the video conference 121 that are not part of the user priority list 112A. For example, the video stream processor 152 may determine there is sufficient area in the UI 124A to present one or more video streams of participants not included in the user priority list 112A in addition to each video stream of the participants included in the user priority list 112A. In some embodiments, the video stream processor 152 may modify a position or a size of one or more visual representations video streams according to the user priority list 112A, such to cause one or more of the video streams to be rearranged in the UI. Once the video stream processor has determined video streams for presentation in the UI, the video stream processor 152 may notify the UI controller 154 of the determined video streams. Further details with regard to video stream processor 152 are described below with respect to FIGS. 2A-2C and FIG. 3.

The User Interface (UI) controller 154 may provide a UI for a video conference. The UI may include multiple regions. Each region may display a video stream pertaining to one or more participant of the video conference. The UI controller 154 may control which video stream is to be displayed by providing a command to the client devices that indicates which video stream is to be displayed in which region of the UI (along with the received video and audio streams being provided to the client devices). For example, in response to being notified of the determined video streams for presentation in the UI 124A-124N, the UI controller 154 may transmit a command causing each determined video streams to be displayed in a region of the UI and/or rearranged in the UI.

As described previously, an audiovisual component of each client device may capture images and generate video data (e.g., a video stream) of the captured data of the captured images. In some implementations, the client devices 102A-102N and/or client device(s) 104 may transmit the generated video stream to video conference manager 122. The audiovisual component of each client device may also capture an audio signal representing speech of a user and generate audio data (e.g., an audio file or audio stream) based on the captured audio signal. In some implementations, the client devices 102A-102N and/or client device(s) 104 may transmit the generated audio data to video conference manager 122.

In some implementations, video conference platform 120 and/or server 130 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to connect with other users via a video conference. Video conference platform 120 may also include a website (e.g., a webpage) or application back-end software that may be used to enable a user to connect with other users via the video conference.

It is appreciated that in some other implementations, the functions of server 130 or video conference platform 120 may be provided by a fewer number of machines. For example, in some implementations, server 130 may be integrated into a single machine, while in other implementations, server 130 may be integrated into multiple machines. In addition, in some implementations, server 130 may be integrated into video conference platform 120.

In general, functions described in implementations as being performed by video conference platform 120 or server 130 may also be performed by the client devices 102A-N and/or client device(s) 104 in other implementations, if appropriate. In addition, the functionality attributed to a particular component may be performed by different or multiple components operating together. Video conference platform 120 and/or server 130 may also be accessed as a service provided to other systems or devices through appropriate application programming interfaces, and thus is not limited to use in websites.

Although implementations of the disclosure are discussed in terms of video conference platform 120 and users of video conference platform 120 participating in a video conference, implementations may also be generally applied to any type of telephone call or conference call between users. Implementations of the disclosure are not limited to video conference platforms that provide video conference tools to users.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the video conference platform 120.

In situations in which the systems discussed here collect personal information about users, or may make use of personal information, the users may be provided with an opportunity to control whether video conference platform 120 collects user information (e.g., information about a user's social network, social actions or activities, profession, a user's preferences, or a user's current location), or to control whether and/or how to receive content from the server 130 that may be more relevant to the user. In addition, certain data may be treated in one or more ways before it is stored or used, so that personally identifiable information is removed. For example, a user's identity may be treated so that no personally identifiable information may be determined for the user, or a user's geographic location may be generalized where location information is obtained (such as to a city, ZIP code, or state level), so that a particular location of a user cannot be determined. Thus, the user may have control over how information is collected about the user and used by the video conference platform 120 and/or server 130.

Figure 2A:
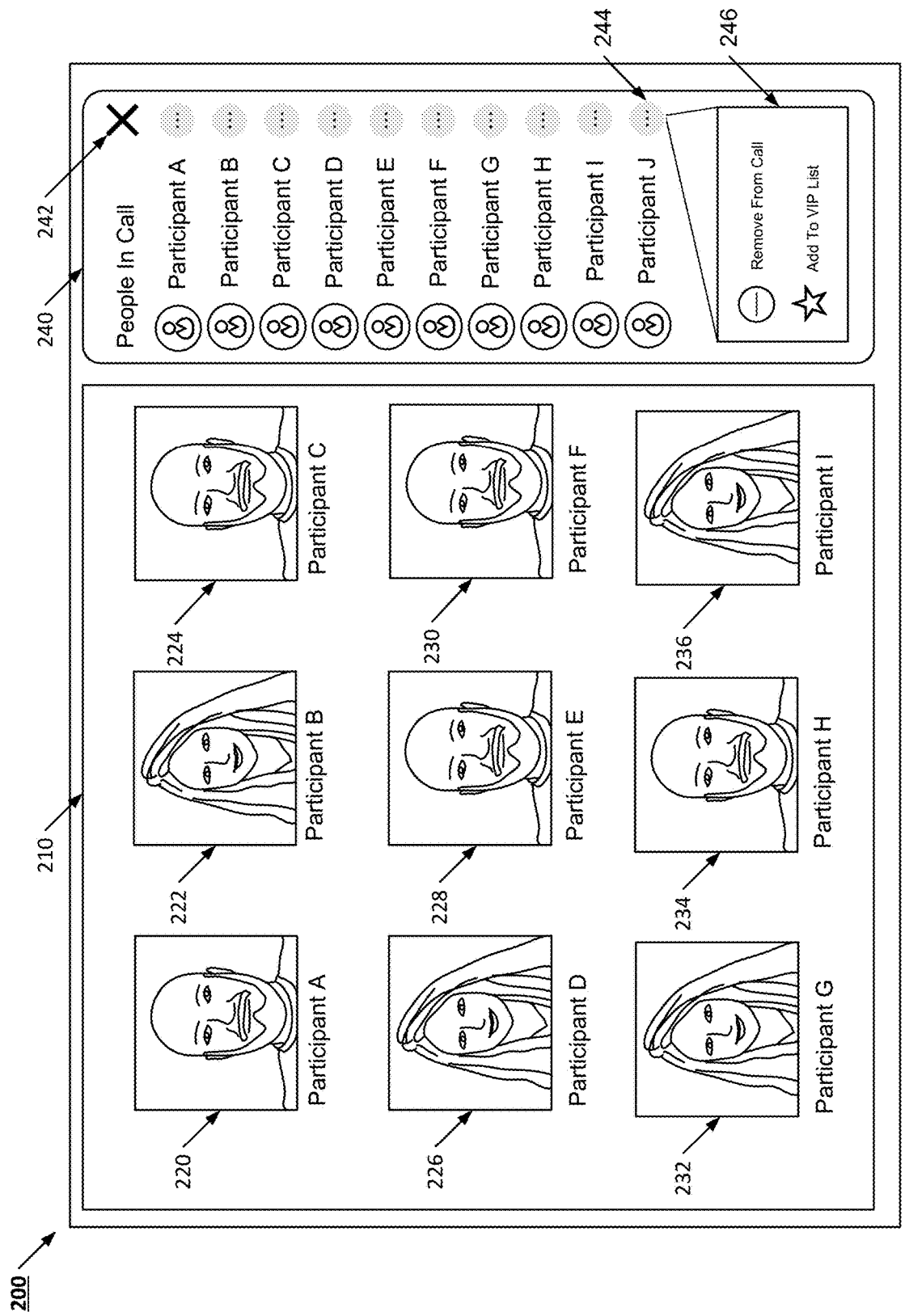
FIG. 2A illustrates an example user interface (UI) of a video conference, in accordance with implementations of the present disclosure.

FIG. 2A illustrates an example user interface (UI) 200 for a video conference, in accordance with some embodiments of the present disclosure. The UI 200 may be generated one or more processing devices of the server 130. In some embodiments, the UI 200 may be generated by a video conference manager, such as video conference manager 122 of FIG. 1, for presentation at a client device (e.g., client devices 102A-102N and/or 104). In some implementations, the video conference between multiple participants may be managed by a video conference platform, such as video conference platform 120 of FIG. 1. As illustrated in FIG. 1, video conference manager 122 may provide the UI 200 to enable participants (e.g., participants A-J) to join and participate in the video conference.

UI 200 may include multiple regions, including a region 210 to display one or more video streams corresponding to video data captured and/or streamed by client devices, such as client devices 102A-102N of FIG. 1, associated with participants of the video conference, and a scrollable region 240 to display a list of participants of the video conference. It may be noted that a participant of the video conference may be displayed in the list of participants of the video conference within the scrollable region 240 but not displayed within region 210. For example, Participant J is a participant of the video conference as indicated by the scrollable region 240, but is not currently displayed within the region 210, as illustrated.

The region 210 may include multiple regions, each to display a video stream corresponding to the video data captured and/or streamed by client associated with participants of the video conference. In an illustrative example, the region 210 may include a region 220, a region 222, a region 224, a region 226, a region 228, a region 230, a region 232, a region 234, and a region 236. As illustrated, the region 220 may display a video stream corresponding to video data captured and/or streamed by a client device associated with Participant A. The region 222 may display a video stream corresponding to video data captured and/or streamed by a client device associated with Participant B. The region 224 may display a video stream corresponding to video data captured and/or streamed by a client device associated with Participant C. The region 226 may display a video stream corresponding to video data captured and/or streamed by a client device associated with Participant D. The region 228 may display a video stream corresponding to video data captured and/or streamed by a client device associated with Participant E. The region 230 may display a video stream corresponding to video data captured and/or streamed by a client device associated with Participant F. The region 232 may display a video stream corresponding to video data captured and/or streamed by a client device associated with Participant G. The region 234 may display a video stream corresponding to video data captured and/or streamed by a client device associated with Participant H. The region 236 may display a video stream corresponding to video data captured and/or streamed by a client device associated with Participant I.

In some implementations, the video conference manager 122 may associate each region with a video stream received from a client device. For example, the processing device may determine that the region 220 is to display a video stream from the client device of Participant A (e.g., based on an identifier associated with each client device and/or each participant). In some implementations, this may be done automatically without any user input specifying which video stream is to be displayed at the region 220 within the UI 200.

In some implementations, the UI 200 may also include an options region (not illustrated in FIG. 2A) for providing selectable options to adjust display settings (e.g., a size of each region, a number of regions, a selection of a video stream, etc.), invite additional users to participate, etc. In some implementations, the UI 200 may include a UI element (e.g., an icon) (not illustrated in FIG. 2A) that corresponds to a self-view indicator, which may indicate to a participant if the participant's video stream is displayed in a region in the UI.

In some implementations, the UI 200 may include a scrollable region 240 to display a list of participants of the video conference. It is noted that a participant of the video conference may be displayed in the list of participants of the video conference within the scrollable region 240 but not displayed within region 210. In an illustrative example, Participant J is a participant of the video conference as indicated by the scrollable region 240, but is not currently displayed within the region 210. In some embodiments, the scrollable region 240 may be an expandable/collapsible region. In response to a user interaction with a UI element 242, the processing device may cause the scrollable region 240 to disappear and region 210 to be expanded into the portion of the UI 200 previously occupied by the scrollable region.

In some embodiments, the scrollable region 240 may include an interactable options UI element for each participant displayed within the of the participants. For example, the scrollable region 240 may include an options UI element 244 associated with Participant J of the video conference. In response to a user interaction with the options UI element 244, the processing device may cause an options list 246 to be displayed to the user. The user may interact with the options list 246 to cause Participant J to be removed from the call, to be added to the user's User priority list (e.g., User priority list 112A of FIG. 1), and the like. For example, responsive to a user interaction with a UI element of the options list 246 labeled "Add to VIP list," Participant J is added to the user's user priority list. Responsive to adding Participant J to the user priority list, the processing device may cause the UI 200 to be rearranged to include the video stream of Participant J in the UI, as illustrated below with respect to FIG. 2B and FIG. 2C. In some embodiments, the user may interact with a UI outside of the video conference and separate from UI 200 to update (e.g., add users to, remove users from, etc.) the user priority list. For example, a given user may add, edit, or remove other users from their user priority list outside of a video conference such that video streams other users the given user is interested in viewing may immediately be displayed within the UI 200.

In some embodiments, the user may interact with the UI 200 to cause a modification of a size or a position of video streams displayed within the UI 200. For example, the user may use an input device (e.g., a keyboard, a touch screen etc.) or a cursor device (e.g., a mouse) associated with the client device to cause a modification of the size or the position of the video streams displayed within the UI 200. In some embodiments, the user may cause a modification of the position of the video streams from the region 210 to the region 240 or outside of the UI 201. For example, in response to a user interaction (e.g., via a cursor, a touch screen etc.), the video stream of participant A may be detached from the UI 201 and moved from region 220 to region 240 and overlay existing UI elements within the region 240. It is appreciated that the user may cause various modifications of video streams. For example, video streams may be resized, moved, zoomed in, cropped, transferred to another display device (e.g., another monitor), or otherwise adjusted to provide a preferred viewing environment. In another example, users may apply filters (e.g., sharpening filters, stylization filters, etc.), add contrast adjustments, or otherwise alter visual aesthetics of video streams according to a user's personal preference.

Figure 2B:
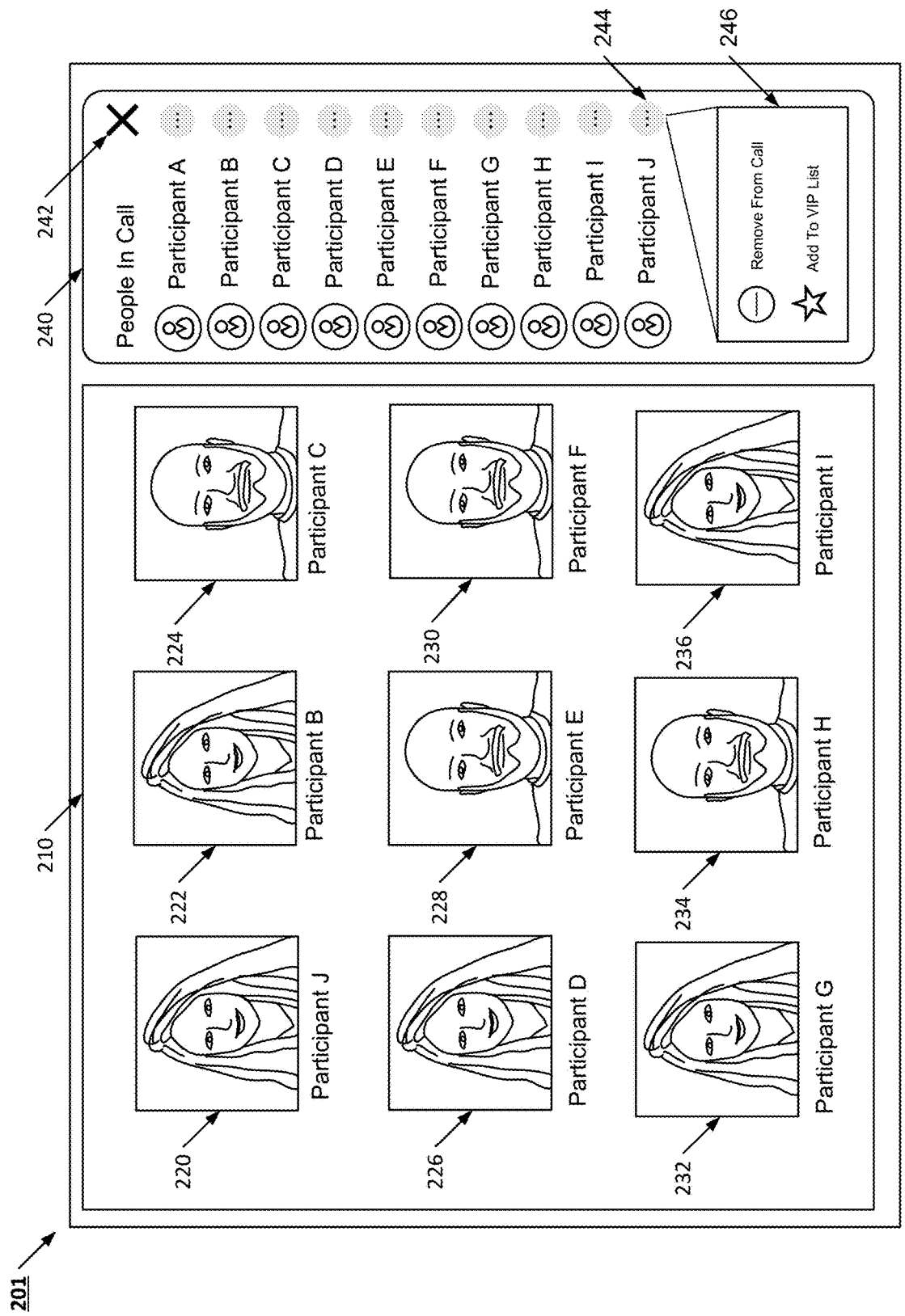
FIG. 2B illustrates another example user interface (UI) of a video conference, in accordance with implementations of the present disclosure.

In some implementations, the processing device may determine each of the video streams for presentation in each region within the region 210. For example, FIG. 2B illustrates another example user interface (UI) 201 of a video conference, in accordance with some embodiments of the present disclosure. In some implementations, the processing device may, in response to a request of a given user to participate in the video conference, access a user priority list (e.g., user priority list 112A) associated with a given user. The user priority list may include one or more identifiers of users of the video conference platform other than the first user.

The processing device may determine video streams to be provided for presentation in the UI 201 based on the user priority list. In some instances, video streams of a subset of participants of the video conference may be provided for display within the region 210 of the UI 201. Inclusion within the subset of participants may depend on whether the respective participant is part of the user priority list. The processing device may cause video streams of participants included in the user priority list to be displayed within the region 210 of the UI 201 and may refrain from causing video streams of participants not included in the user priority list to be displayed within the region 210 of the UI 201. For example, the processing device may determine that Participant J is included in the user priority list and cause the video stream of Participant J to be displayed within UI 201. The processing device may determine that Participant A is not included in the user priority list and refrain from causing the video stream of Participant A to be displayed within the UI 201. In some embodiments, the processing device may cause a video stream of a participant not included in the user priority list to be removed from the UI and replaced by a video stream of a participant that is included in the user priority list that was not already displayed within the UI 201. As illustrated in FIG. 2B, the video stream of Participant A is no longer displayed within the UI 201 at the region 220 and the video stream of Participant J is now displayed within the UI 201 at the region 220.

In some embodiments, the processing device may determine video streams to be provided for presentation in the UI 201 based on existing implementations in addition to the user priority list. For example, some video conference platforms may include a layout in which a specific region is presented in a UI to display a video stream of a participant who is actively speaking in the video conference. Aspects and implementations of the present disclosure may function in cooperation with such existing techniques. For example, the processing device may determine region 220 of the UI 201 is dedicated to display the video stream of the participant who is actively speaking in the video conference. The processing device may determine other video streams to be provided for presentation within the other regions of region 210 of the UI 201 according to the techniques described herein.

As described above, video streams of a subset of participants of the video conference may be provided for display within the UI 201. The processing device may include one or more participants from the user priority list in the subset of participants and may refrain from including one or more other participants that are not part of the user priority list. However, in some instance, there may be sufficient area in the UI to include video streams of participants not included in the user priority list. Accordingly, one or more participants not included in the user priority list may nevertheless be included in the subset of participants of the video conference whose video streams are provided for display within the UI 201. In such instances, the processing device may rearrange video streams in the UI based on whether participants corresponding to the displayed video streams are included in the user priority list. The video conference manager (e.g., video conference manager 122) may modify a position or a size of one or more of the displayed video streams, such as to cause the one or more of the displayed video streams be rearranged in the UI for presentation within the region 210.

Figure 2C:
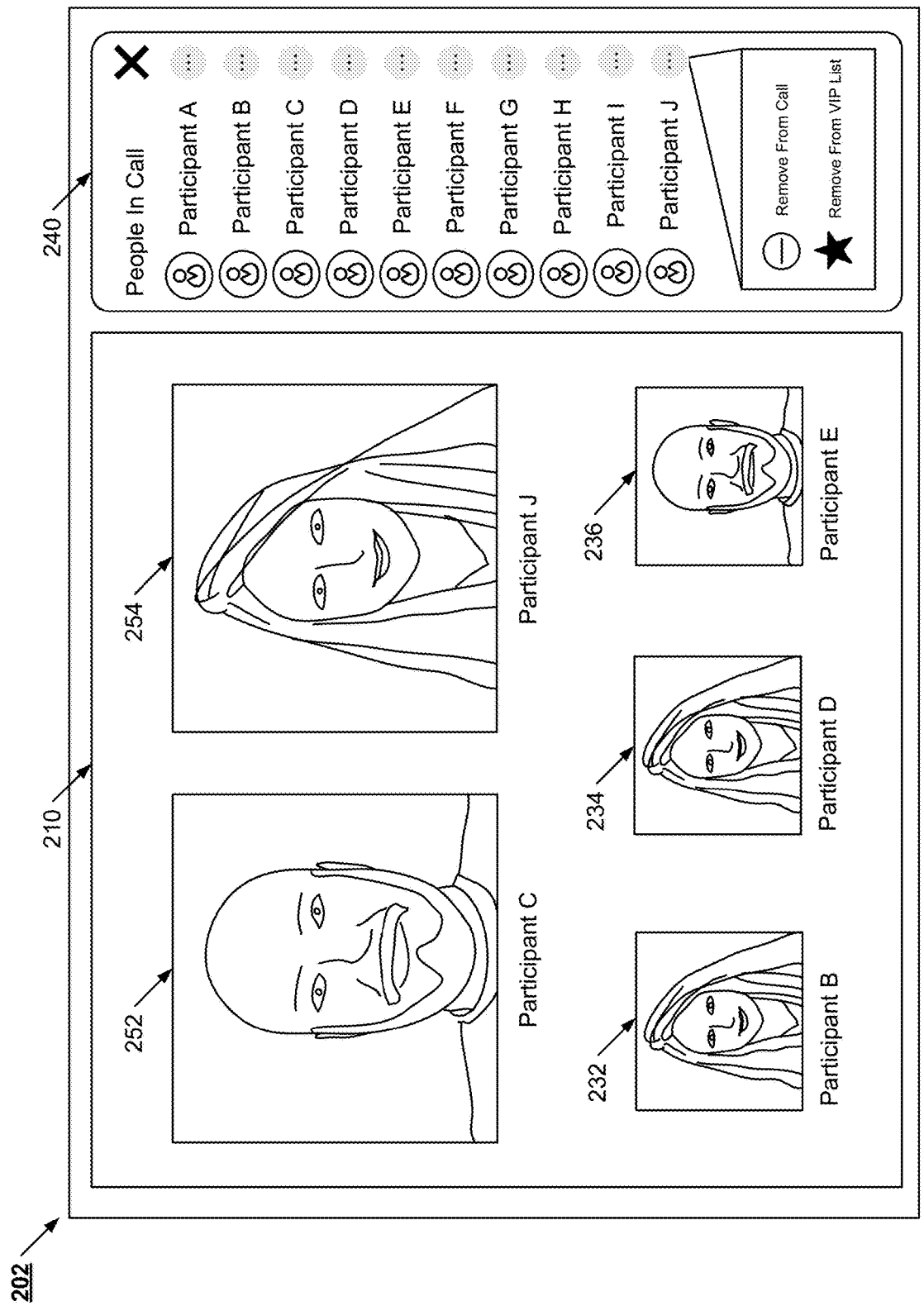
FIG. 2C illustrates another example user interface (UI) of a video conference, in accordance with implementations of the present disclosure.

For example, FIG. 2C illustrates another example user interface (UI) 202 of a video conference, in accordance with some embodiments of the present disclosure. The processing device may determine video streams to be rearranged in the UI 202 based on the user priority list. In some embodiments, a size of at least one video stream of participants not included in the user priority list may be decreased to occupy a lesser area of the UI 202. A size of at least one video stream of a participant that is included in the user priority list may be increased to occupy the area previously occupied by the at least one video stream of the participant not included in the user priority list. In some embodiments, one or more video streams associated with participants that are part of the user priority list may be moved to occupy a "main" region of the UI 202 and/or one or more video streams of participants that are not included in the user priority list may be moved away from the "main" portion of the UI 202. The "main" portion of the UI 202 may include an upper portion of the UI 202 or a central portion of the UI 202. As illustrated, the region 252 and the region 254 may correspond to a "main regions," e.g., areas in the UI 202 that are placed at or near the center or a focus area of the UI 202. In some embodiments, the region 232, the region 234 and the region 236 may correspond to "thumbnail regions." A thumbnail region may refer to an area of the UI 202 that may be located along a side (e.g., a bottom side) of the UI 202. Similar to the main region, the thumbnail region is also associated with a video stream received from the client device and displays the video stream. However, the thumbnail region spans a smaller area than the main region, thereby presenting images of the associated video stream in a relatively smaller scale than the main region.

In an illustrative example, the processing device may determine that Participant B is not included in the user priority list. Thus, the video stream of Participant B is moved to a region 232 at the bottom of the UI 202. The processing device may determine that Participant D is not included in the user priority list. Thus, the video stream of Participant D is moved to a region 234 at the bottom of the UI 202. The processing device may determine that Participant E is not included in the user priority list. Thus, the video stream of Participant E is moved to a region 236 at the bottom of the UI 202. The processing device may determine that Participant C is included in the user priority list. Thus, the video stream of Participant C is moved to a region 252 at a top and center location of the UI 202. The processing device may determine that Participant J is included in the user priority list. Thus, the video stream of Participant J is moved to a region 254 at a top and center location of the UI 202. As further illustrated, the video streams of the participants included in the user priority list (Participant C and Participant J) are relatively bigger than the video streams of participants that are not included in the user priority list (Participant B, Participant D, and Participant E) to catch the attention of participants of the video conference (e.g., users of the client devices).

In some embodiments, the processing device may provide multiple UI layouts and cause the UI to switch to one of the multiple UI layouts responsive to detecting a participant in the video conference is included in the user priority list. For example, the processing device may cause the UI 200 of FIG. 2A to switch to the UI 202 of FIG. 2C in response to detecting Participant C and Participant J are included in the user priority list such that Participant C and Participant J are displayed more prominently (e.g., in a "main" region of the UI).

It is appreciated that UI layouts described with respect to FIG. 2A-C are provided by way of example, and not by way of limitation. In some embodiments, the video conference platform may include multiple predefined arrangements or configurations of videos streams with a UI. In some embodiments, the video conference platform may include one or more pre-defined layouts that are designed to display participants of a user priority list. In some embodiments, users may create personalized layouts of video streams with a UI tailored to their own preferences. In some embodiments, such layouts may be displayed independently between users such that a given user's personalized layouts and user priority list may not affect layout selection or rendering of other participants in the same video conference.

FIG. 3 depicts a flow diagram of a method 300 for providing video streams for presentation in a user interface (UI) of a video conference based on a user priority list, in accordance with implementations of the present disclosure. Method 300 may be performed by processing logic that may include hardware (circuitry, dedicated logic, etc.), software (e.g., instructions run on a processing device), firmware, and/or a combination thereof. In one implementation, some or all the operations of method 300 may be performed by one or more components of system 100 of FIG. 1 (e.g., video conference platform 120, server 130 and/or video conference manager 122).

For simplicity of explanation, the method 300 of this disclosure is depicted and described as a series of acts. However, acts in accordance with this disclosure may occur in various orders and/or concurrently, and with other acts not presented and described herein. Furthermore, not all illustrated acts may be required to implement the method 300 in accordance with the disclosed subject matter. In addition, those skilled in the art will understand and appreciate that the method 300 could alternatively be represented as a series of interrelated states via a state diagram or events. Additionally, it should be appreciated that the method 300 disclosed in this specification are capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At block 302, in response to a request of a first user of a video conference platform (e.g., video conference platform 120 of FIG. 1) to participate in a video conference (e.g., video conference 121 of FIG. 1), processing logic accesses a user priority list (e.g., user priority list 112A of user priority lists 112A-N of FIG. 2) associated with the first user, wherein the user priority list identifies multiple other users of the video conference platform.

At block 304, processing logic identifies multiple participants of a video conference (e.g., video conference 121 of FIG. 1). The multiple participants include the first user associated with a first client device (e.g., client device 102A of FIG. 1) of multiple client devices of the multiple participants of the video conference.

At block 306, processing logic provides, for display on the first client device, a user interface (e.g., user interface (UI) 200 of FIG. 2) presenting video streams from client devices of at least a subset of the multiple participants. The presentation of each of the video streams in the UI depends on whether a respective participant of the at least the subset of the multiple participants is included in the user priority list. In some embodiments, to provide the UI presenting the video streams from the client devices of the at least the subset of the multiple participants, the processing logic identifies, among the plurality of participants, one or more participants from the user priority list and includes the one or more participants from the user priority list in the at least the subset of the multiple participants. In some embodiments, to include the one or more participants from the user priority list in the at least the subset of the multiple participants, the processing logics refrains from including, in the at least the subset of the multiple participants, one or more other participants that are not part of the user priority list. In some embodiments, the user priority list may be stored on a server (e.g. server 130 of FIG. 1) or a client device (e.g., client device 102) and persist between video conferences in which the user participates in to ensure that participants that are important to the user are visible to the user throughout video conferences the user attends without manual input from the user.

In some embodiments, videos streams of users that are not part of the user priority list may be provided for presentation. For example, to provide the UI presenting the video streams from the client devices of the at least the multiple participants, the processing logic further may identify, among the multiple participants, one or more other participants that are not part of the user priority list and include the one or more other participants that are not part of the user priority list in the at least the subset of the multiple participants.

In some embodiments, the processing logic may rearrange videos streams in the UI based on whether a respective video stream corresponds to a participant included in the user priority list. To rearrange video streams in the UI based on whether a respective video stream corresponds to a participant included in the user priority list, the processing logic may at least increase a size of a visual representation of one or more video streams corresponding to participants included in the user priority list or decrease a size of a visual representation of one or more video streams corresponding to participants not included in the user priority list.

In some embodiments, to rearrange video streams in the UI based on whether a respective video stream corresponds to a participant included in the user priority list, the processing logic may modify a location of one or more video streams corresponding to participants included in the user priority list to a respective main region of one or more main regions of the UI and modify a location of video streams corresponding to other participants not included in the user priority list to a respective other region of one or more other regions of the UI. For example, the one or more main regions of the UI may include region 252 and region 254 of UI 202 and the one or more other regions of the UI may include region 232, region 234, and region 236 of UI 202, as described above with respect to FIG. 2C.

In some embodiments, the processing logic may identify an additional user of the video conference platform to be added to the user priority list and update the user priority list to include the additional user. The processing logic may store the updated user priority list in a data store (e.g., data store 110 of FIG. 1) in association with an identifier of the first user for use in subsequent video conferences in which the first user is to participate. In some embodiments, the data store may store multiple user priority lists (e.g., user priority lists 112A-N of FIG. 1) each associated with an identifier of one of multiple users of the video conference platform.

In some embodiments, to identify an additional user to be added to the user priority list, the processing logic may receive a request from the first client device to add the additional user of the video conference platform to the user priority list. In some embodiments, the request is received in response to an interaction by the first user with one or more UI elements of the UI. For example, Participant J may be added to the user priority list in response to a user interaction with a UI element of the options list 246, as described above with respect to FIG. 2A.

In some embodiments, responsive to an update of the user priority list to include the additional user, the processing logic may identify a participant of the video conference corresponding to the additional user and include the participant in the at least the subset of the multiple participants whose video streams are provided for presentation in the UI.

In some embodiments, the processing logic may further restrict access to the user priority list to the first user. In some embodiments, when an additional user is added to the user priority list, a notification to the additional user is suppressed. In some embodiments, when an additional user is added to the user priority list, a notification is not generated. Accordingly, a given user's user priority list can be personal in that individuals included in the user priority list are specific to the given user and, in some embodiments, may not be shared with other users of the content sharing platform.

In some embodiments, to identify the additional user, the processing logic may use a machine learning model to predict the additional user that the first user is likely to be interested in including in the user priority list and cause an identifier of the additional user to be presented to the first user as a suggested addition to the user priority list. In some embodiments, the processing logic can receive (e.g., in response to the first user interaction with a UI element) a confirmation of the first user to add the additional user to the user priority list.

In some embodiments, the machine learning model to predict the additional user (or users) may utilize various techniques to identify important persons associated with the first user of the platform and provide suggestions of other users to add to the first user's user priority list. Historical data of social metrics (e.g., number of connections, engagement level, activity patterns) may be used to train a machine learning model to predict important persons associated with a given user. In some embodiments, the machine learning model may leverage data from other platforms to predict important persons associated with the given user. For example, the first user may interact with a same set of users on a collaborative document platform and the video conference platform described herein. The collaborative document platform may allow users to synchronously edit (e.g., via a client device) and collaborate on an electronic document. In some instances, the video conference platform and the collaborative document platform may be integrated as a productively tool and share the same set of users and user data. Accordingly, the machine learning model may identify important people associated with the given user based on the first user's interactions within the collaborative document platform. For example, the machine learning model may identify common approvers and/or reviewers of the given user's electronic documents on the collaborative document platform. The machine learning model may leverage such data to predict important persons associated with the given user and provide the predicted important persons (users) as suggestions for the given user to add to their user priority list. The user may interact with one or more UI elements of the UI to add one or more of the suggested users to their user priority list.

It is appreciated that other machine learning approaches are considered and may be implemented without deviating from the scope of the present disclosure. For example, a graph-based approach is contemplated to identify important persons associated with a user of the video conference platform. A given user's social network within the video conference platform may be represented as a graph, where the nodes are users of the video conference platform, and the edges are relationships. The graph-based approach may identify important persons (users) based on connections, influence, or position within the graph.

In some instances, there may be insufficient area within the UI to present video streams of every participant included in the user priority list. For example, a mobile client device may have a limited amount of display area, but the user of the client device may have a large user priority list that contains ten participants of the meeting. It may be unreasonable to display each video stream of the ten participants within the UI for display on the mobile client device. In some embodiments, the user may provide an indication of their "favorites" among users included within the user priority list. The processing logic may prioritize displaying video streams of participants indicated as "favorites" within the UI over displaying videos streams of participants not indicated as "favorites" in a similar manner that it prioritizes displaying video streams of participants included in the user priority list over displaying video streams of users not included in the user priority list.

Figure 4:
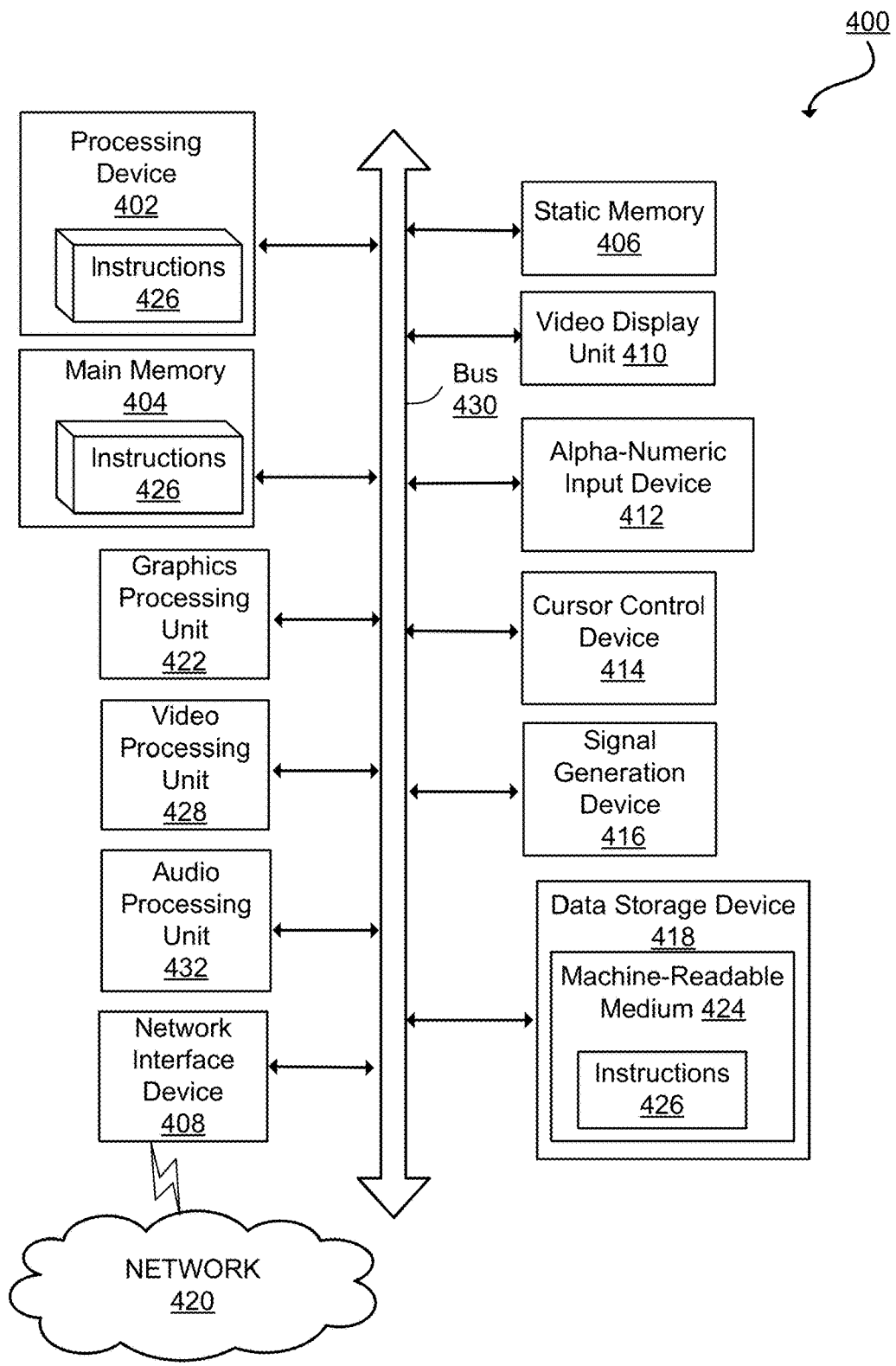
FIG. 4 is a block diagram illustrating an exemplary computer system, in accordance with implementations of the present disclosure.

FIG. 4 illustrates an example machine of a computer system 400 within which a set of instructions, for causing the machine to perform any one or more of the methodologies discussed herein, may be executed. The computer system 400 may be server 130 or client devices 102A-N of FIG. 1. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 430.

Processing device 402 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 402 may be configured to execute instructions 426 for performing the operations and steps described herein.

The computer system 400 may further include a network interface device 408 to communicate over the network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), a graphics processing unit 422, a signal generation device 416 (e.g., a speaker), graphics processing unit 422, video processing unit 428, and audio processing unit 432.

The data storage device 418 may include a machine-readable storage medium 424 (also known as a non-transitory computer readable storage medium) on which is stored one or more sets of instructions 426 or software embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media.

In some implementations, the instructions 426 include instructions to implement functionality corresponding to the present disclosure. While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine, allowing the machine and the processing device 402 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform a similar sequence of procedures. In addition, the present disclosure is not described with reference to any particular programming language and any one in use in such computer systems may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element may be depicted in the figures and like elements are labeled with like numerals. The disclosure and drawings are, accordingly, to be regarded in an illustrative sense rather than a restrictive sense.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification may, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" may come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, engines, modules, and so on have been described with respect to interact between several components and/or blocks. It can be appreciated that such systems, engines, components, blocks, and so forth may include those components or specified sub-components, some of the specified components or sub-components, and/or additional components, and according to various permutations and combinations of the foregoing. Sub-components may also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above. The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   in response to a request of a first user of a video conference platform to participate in a video conference, accessing a first user priority list that was previously created for use across a plurality of video conferences associated with the first user, wherein the first user priority list specifies a first plurality of other users of the video conference platform, wherein at least one of the first plurality of other users of the video conference platform is determined using a machine learning model trained to predict one or more additional users that the first user is likely to be interested in including in the first user priority list for the video conference platform;
   in response to a request of a second user of the video conference platform to participate in the video conference, accessing a second user priority list that was previously created for use across a plurality of video conferences associated with the second user, wherein the second user priority list specifies a second plurality of other users of the video conference platform, and wherein the second plurality of other users differs from the first plurality of other users;
   identifying a plurality of participants of the video conference, the plurality of participants comprising:
   the first user associated with a first client device of a plurality of client devices of the plurality of participants of the video conference, a first subset of participants included in the first user priority list created for use across the plurality of video conferences associated with the first user, a second subset of participants not included in the first user priority list created for use across the plurality of video conferences associated with the first user;

the second user associated with a second client device of the plurality of client devices of the plurality of participants of the video conference, a third subset of participants included in the second user priority list created for use across the plurality of video conferences associated with the second user, and a fourth subset of participants not included in the second user priority list created for use across the plurality of video conferences associated with the second user;

determining, without manual input of the first user or the second user and based on the first user priority list created for use across the plurality of video conferences associated with the first user and the second user priority list created for use across the plurality of video conferences associated with the second user, which of the plurality of participants are to be visually represented in a first user interface (UI) displayed on the first client device during the video conference and which of the plurality of participants are to be visually represented in a second UI displayed on the second client device during the video conference;

providing, for display on the first client device during the video conference and based on the determining, the first UI presenting one or more video streams from one or more client devices of the first subset of participants while refraining from presenting one or more video streams from one or more client devices of the second subset of participants; and providing, for display on the second client device during the video conference and based on the determining, the second UI presenting one or more video streams from one or more client devices of the third subset of participants while refraining from presenting one or more video streams from one or more client devices of the fourth subset of participants.

2. The method of claim 1, further comprising causing the first UI to present, at another point in time during the video conference, one or more participants that are not part of the first user priority list.

3. The method of claim 2, further comprising rearranging video streams in the first UI based on whether a respective video stream corresponds to a participant included in the first user priority list.

4. The method of claim 3, wherein rearranging the video streams in the first UI based on whether a respective video stream corresponds to a participant included in the first user priority list comprises at least one of increasing a size of a visual representation of one or more video streams corresponding to participants included in the first user priority list, or decreasing a size of a visual representation of one or more video streams corresponding to participants not included in the first user priority list.

5. The method of claim 3, wherein rearranging video streams in the first UI based on whether a respective video stream corresponds to a participant included in the first user priority list comprises:

modifying a location of one or more video streams corresponding to participants included in the first user priority list to a respective main region of one or more main regions of the first UI; and modifying a location of one or more video streams corresponding to other participants not included in the first user priority list to a respective other region of one or more other regions of the first UI.

6. The method of claim 1, further comprising:

identifying an additional user of the video conference platform to be added to the first user priority list;

updating the first user priority list to include the additional user to obtain an updated first user priority list; and storing the updated first user priority list in a data store in association with an identifier of the first user for use in subsequent video conferences in which the first user is to participate, wherein the data store stores a plurality of user priority lists each associated with an identifier of one of a plurality of users of the video conference platform.

7. The method of claim 6, wherein identifying the additional user comprises:

receiving a request from the first client device to add the additional user of the video conference platform to the first user priority list, wherein the request is received in response to an interaction by the first user with one or more UI elements of the first UI.

8. The method of claim 1, further comprising:

providing one or more social metrics as input to the machine learning model to predict an additional user that the first user is likely to be interested in including in the first user priority list;

causing an identifier of the additional user to be presented to the first user as a suggested addition to the first user priority list; and receiving a confirmation of the first user to add the additional user to the first user priority list.

9. The method of claim 6, further comprising:

responsive to updating the first user priority list to include the additional user:

identifying a participant of the plurality of participants of the video conference corresponding to the additional user; and including the participant in the at least the subset of the plurality of participants.

10. The method of claim 1, further comprising restricting access to the first user priority list to the first user, wherein when an additional user is added to the first user priority list, a notification to the additional user is suppressed.

11. A system comprising:

a memory device; and a processing device coupled to the memory device, the processing device to perform operations comprising:

in response to a request of a first user of a video conference platform to participate in a video conference, accessing a first user priority list that was previously created for use across a plurality of video conferences associated with the first user, wherein the first user priority list specifies a first plurality of other users of the video conference platform, wherein at least one of the first plurality of other users of the video conference platform is determined using a machine learning model trained to predict one or more additional users that the first user is likely to be interested in including in the first user priority list for the video conference platform;

in response to a request of a second user of the video conference platform to participate in the video conference, accessing a second user priority list that was previously created for use across a plurality of video conferences associated with the second user, wherein the second user priority list specifies a second plurality of other users of the video conference platform, and wherein the second plurality of other users differs from the first plurality of other users;

identifying a plurality of participants of the video conference, the plurality of participants comprising:
the first user associated with a first client device of a plurality of client devices of the plurality of participants of the video conference,
a first subset of participants included in the first user priority list created for use across the plurality of video conferences associated with the first user,
a second subset of participants not included in the first user priority list created for use across the plurality of video conferences associated with the first user;
the second user associated with a second client device of the plurality of client devices of the plurality of participants of the video conference,
a third subset of participants included in the second user priority list created for use across the plurality of video conferences associated with the second user, and
a fourth subset of participants not included in the second user priority list created for use across the plurality of video conferences associated with the second user;

determining, without manual input of the first user or the second user and based on the first user priority list created for use across the plurality of video conferences associated with the first user and the second user priority list created for use across the plurality of video conferences associated with the second user, which of the plurality of participants are to be visually represented in a first user interface (UI) displayed on the first client device during the video conference and which of the plurality of participants are to be visually represented in a second UI displayed on the second client device during the video conference;

providing, for display on the first client device during the video conference and based on the determining, the first UI presenting one or more video streams from one or more client devices of the first subset of participants while refraining from presenting one or more video streams from one or more client devices of the second subset of participants; and providing, for display on the second client device during the video conference and based on the determining, the second UI presenting one or more video streams from one or more client devices of the third subset of participants while refraining from presenting one or more video streams from one or more client devices of the fourth subset of participants.

12. The system of claim 11, the operations further comprising causing the first UI to present, at another point in time during the video conference,
one or more participants that are not part of the first user priority list.

13. The system of claim 11, the operations further comprising:
providing one or more social metrics as input to the machine learning model to predict an additional user that the first user is likely to be interested in including in the first user priority list;
causing an identifier of the additional user to be presented to the first user as a suggested addition to the first user priority list; and receiving a confirmation of the first user to add the additional user to the first user priority list.

14. The system of claim 11, the operations further comprising restricting access to the user priority list to the first user, wherein when an additional user is added to the first user priority list, a notification to the additional user is suppressed.

15. A non-transitory computer readable storage medium comprising instructions for a server that, when executed by a processing device, cause the processing device to perform operations comprising:
in response to a request of a first user of a video conference platform to participate in a video conference, accessing a first user priority list that was previously created for use across a plurality of video conferences associated with the first user, wherein the first user priority list specifies a first plurality of other users of the video conference platform, wherein at least one of the first plurality of other users of the video conference platform is determined using a machine learning model trained to predict one or more additional users that the first user is likely to be interested in including in the first user priority list for the video conference platform;

in response to a request of a second user of the video conference platform to participate in the video conference, accessing a second user priority list that was previously created for use across a plurality of video conferences associated with the second user, wherein the second user priority list specifies a second plurality of other users of the video conference platform, and wherein the second plurality of other users differs from the first plurality of other users;

identifying a plurality of participants of the video conference, the plurality of participants comprising:
the first user associated with a first client device of a plurality of client devices of the plurality of participants of the video conference,
a first subset of participants included in the first user priority list created for use across the plurality of video conferences associated with the first user,
a second subset of participants not included in the first user priority list created for use across the plurality of video conferences associated with the first user;
the second user associated with a second client device of the plurality of client devices of the plurality of participants of the video conference,
a third subset of participants included in the second user priority list created for use across the plurality of video conferences associated with the second user, and
a fourth subset of participants not included in the second user priority list created for use across the plurality of video conferences associated with the second user;

determining, without manual input of the first user or the second user and based on the first user priority list created for use across the plurality of video conferences associated with the first user and the second user priority list created for use across the plurality of video conferences associated with the second user, which of the plurality of participants are to be visually represented in a first user interface (UI) displayed on the first client device during the video conference and which of the plurality of participants are to be visually represented in a second UI displayed on the second client device during the video conference;

providing, for display on the first client device during the video conference and based on the determining, the first UI presenting one or more video streams from one or more client devices of the first subset of participants while refraining from presenting one or more video streams from one or more client devices of the second subset of participants; and providing, for display on the second client device during the video conference and based on the determining, the second UI presenting one or more video streams from one or more client devices of the third subset of participants while refraining from presenting one or more video streams from one or more client devices of the fourth subset of participants.

16. The non-transitory computer readable storage medium of claim 15, the operations further comprising causing the first UI to present, at another point in time during the video conference, one or more participants that are not part of the first user priority list.

17. The non-transitory computer readable storage medium of claim 15, the operations further comprising:
providing one or more social metrics as input to the machine learning model to predict an additional user that the first user is likely to be interested in including in the first user priority list;
causing an identifier of the additional user to be presented to the first user as a suggested addition to the first user priority list; and
receiving a confirmation of the first user to add the additional user to the first user priority list.

18. The non-transitory computer readable storage medium of claim 15, the operations further comprising restricting access to the first user priority list to the first user, wherein when an additional user is added to the first user priority list, a notification to the additional user is suppressed.

\* \* \* \* \*